US006822821B2

United States Patent
Gan et al.

(10) Patent No.: US 6,822,821 B2
(45) Date of Patent: Nov. 23, 2004

(54) METHOD AND APPARATUS FOR PREDICTING A HEAD CRASH IN A DISC DRIVE

(75) Inventors: Samuel SweeChuan Gan, Singapore (SG); MuiChong Chai, Singapore (SG); Terang KongBeng Thia, Singapore (SG); Djohni Chandra, Singapore (SG); Sanh Tran, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 309 days.

(21) Appl. No.: 09/957,527

(22) Filed: Sep. 20, 2001

(65) Prior Publication Data

US 2002/0097516 A1 Jul. 25, 2002

Related U.S. Application Data

(60) Provisional application No. 60/263,016, filed on Jan. 19, 2001.

(51) Int. Cl.[7] .............................................. G11B 21/02
(52) U.S. Cl. ...................................................... 360/75
(58) Field of Search ............................... 360/78.05, 75, 360/31, 25

(56) References Cited

U.S. PATENT DOCUMENTS

| 4,812,927 | A |   | 3/1989  | Fechner ........................ 360/75    |
|-----------|---|---|---------|-------------------------------------------|
| 4,841,389 | A |   | 6/1989  | Hoyt et al. .................... 360/75    |
| 5,168,412 | A |   | 12/1992 | Doan et al. ................... 360/103   |
| 5,539,592 | A |   | 7/1996  | Banks et al. .................. 360/75    |
| 5,880,587 | A |   | 3/1999  | Annis et al. .................. 324/212   |
| 6,008,640 | A |   | 12/1999 | Tan et al. ..................... 324/212  |
| 6,046,871 | A | * | 4/2000  | Schaenzer et al. ............ 360/31     |
| 6,094,973 | A |   | 8/2000  | Novotny ....................... 73/105    |
| 6,600,622 | B1| * | 7/2003  | Smith .......................... 360/77.06 |

FOREIGN PATENT DOCUMENTS

JP          02102432 A   *   4/1990   ............ G01N/3/56

* cited by examiner

Primary Examiner—Andrew L. Sniezek
Assistant Examiner—Daniell L. Negrón
(74) Attorney, Agent, or Firm—Westman, Champlin & Kelly P.A.

(57) ABSTRACT

A head crash in a hard disc drive is predicted by periodically measuring a head-disc contact energy level on an actuator arm supporting the head and identifying a predetermined change in the energy level between at least two energy level measurements. The head-disc contact energy level is measured by a positioning microactuator on the actuator arm, and comparing that energy level to a threshold established during an earlier or selected contact start-stop cycle. A circuit is coupled to the microactuator and is periodically operable to identify a magnitude of contact energy. An indicator is coupled to the circuit and responsive to the representations to indicate presence of symptoms of an impending crash.

26 Claims, 3 Drawing Sheets

METHOD AND APPARATUS FOR PREDICTING A HEAD CRASH IN A DISC DRIVE

CROSS-REFERENCE TO RELATED APPLICATION

This application claims benefit of U.S. Provisional Application No. 60/263,016 filed Jan. 19, 2001 for "Application of Micro-Actuator as a Reliability Tool for a Hard Disk Drive".

FIELD OF THE INVENTION

This invention relates to hard disc drives, and particularly to a method and apparatus for identifying the presence of conditions in a disc drive that are symptomatic of an impending head crash.

BACKGROUND OF THE INVENTION

Direct access storage devices, such as disc drives store data for computers and other data processing and communication systems. Hard disc drives employ one or more rigid discs having storage surfaces on which data may be stored along concentric tracks. A transducing head is positioned by an actuator arm adjacent each disc surface to write data to, and read data from, tracks on the confronting surface. The head is mounted on an air-bearing slider that is arranged to aerodynamically "fly" a specified distance above the disc when the disc rotates at a design rotational velocity. Should the head and slider fail to maintain the specified fly height, there is a risk of a catastrophic head-disc interaction, known as a head crash.

Early in the life cycle of a disc drive, the slider and head fly at the design fly height. Occasional contact with protrusions on the disc surface may create debris that accumulates on the disc and/or the slider. Moreover, deliberate contact with the disc during take-off and landing may, over time, wear through protective overcoats and lubricants on the disc, generating more debris. Accumulated debris on the disc and slider alters the flying characteristics of the slider, causing lower fly height characteristics and greater incidences of contact, called "interaction," with the disc. Eventually, the slider interaction with the disc causes wearing of the disc, ultimately rendering it improbable that the slider will fly over some tracks on the disc. A catastrophic head crash may result, causing a loss of data and, in some cases, system failure.

Because a catastrophic head crash may cause loss of data, or even system failure, it is desirable to predict a head crash before occurrence so corrective action might be taken. Various techniques have been employed to predict possible head crashes in disc drives. Some of these techniques have employed acoustic transducers mounted to, or in, a disc drive for the purpose of detecting head-disc interference. For example, Fechner, in U.S. Pat. No. 4,812,927, describes an acoustic transducer coupled by a waveguide to the head-carrying carriage of a linear motor to detect head-disc interference. Banks et al., in the background to U.S. Pat. No. 5,539,592, describe mounting an acoustic transducer to the slider to detect head-disc interference. Similarly, Doan et al., in U.S. Pat. No. 5,168,412, describe detection and classification of protrusions on a disc by measuring interference energy levels using a special transducer mounted to a test head.

One problem with adding hardware, such as acoustic transducers, to the disc drive is that the cost of the disc drive is increased and valuable space that may be needed for other purposes is diminished. Consequently, several proposals have been made to predict head crash conditions using hardware already present on the drive. For example, the aforementioned Banks et al. patent describes detection of changes in the torque of the actuator arm motor as an indicator of possible head crash conditions. Hoyt et al., in U.S. Pat. No. 4,841,389, describe prediction of crash conditions by measuring a read amplitude of signals recovered by the head at different frequencies to identify the fly height of the head/slider. Tan et al., in U.S. Pat. No. 6,008,640, describe measuring head-disc interference using frequency modulation of the read signal from the head. However, a shortfall of these techniques is that they are not altogether reliable and are not capable of identifying which head or head/arm combination is likely to crash. There exists a need for a technique to reliably identify an impending head crash in a disc drive without additional hardware. The present invention provides a solution to this and other problems, and offers other advantages over the prior art.

SUMMARY OF THE INVENTION

In one embodiment of the invention, a head crash in a hard disc drive is predicted by periodically measuring a head-disc contact energy level on an actuator arm supporting the head. A predetermined change in energy level is identified between at least two energy level measurements.

In preferred forms of this embodiment, the head-disc contact energy is measured by measuring a vibration magnitude of actuator arm during a selected contact start-stop cycle, such as an initial contact start-stop cycle. A threshold representation is stored based on the measured vibration magnitude. Thereafter, the vibration level is periodically measured and compared to the threshold. Preferably, vibration is sensed by a microactuator that is separately operable to fine position the head relative to the disc surface to transfer data between the disc and the head.

In another embodiment of the present invention, a disc drive has an actuator arm supporting a transducing head in confronting relation to a surface of a rotatable recording disc to transfer data between the head and the disc. Sensing means is attached to the actuator arm for indicating a condition of the disc drive symptomatic of an impending crash of the head to the disc surface.

In preferred forms of this embodiment, the sensor means includes a microactuator mounted to the actuator arm and responsive to a drive signal to selectively position the head relative to the disc surface. The microactuator is responsive to vibration of the actuator arm due to contact between the head and the disc surface to provide a signal representative of a magnitude of contact energy between the head and the disc surface. A circuit is coupled to the microactuator and is periodically operable to identify a magnitude of contact energy. An indicator is coupled to the circuit and responsive to the representations to indicate presence of symptoms of an impending crash. A storage device, which may be the disc, stores a representation of a threshold energy magnitude and a level detector detects a predetermined difference between a representation of contact energy magnitude from the microactuator and the stored representation of threshold energy magnitude.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
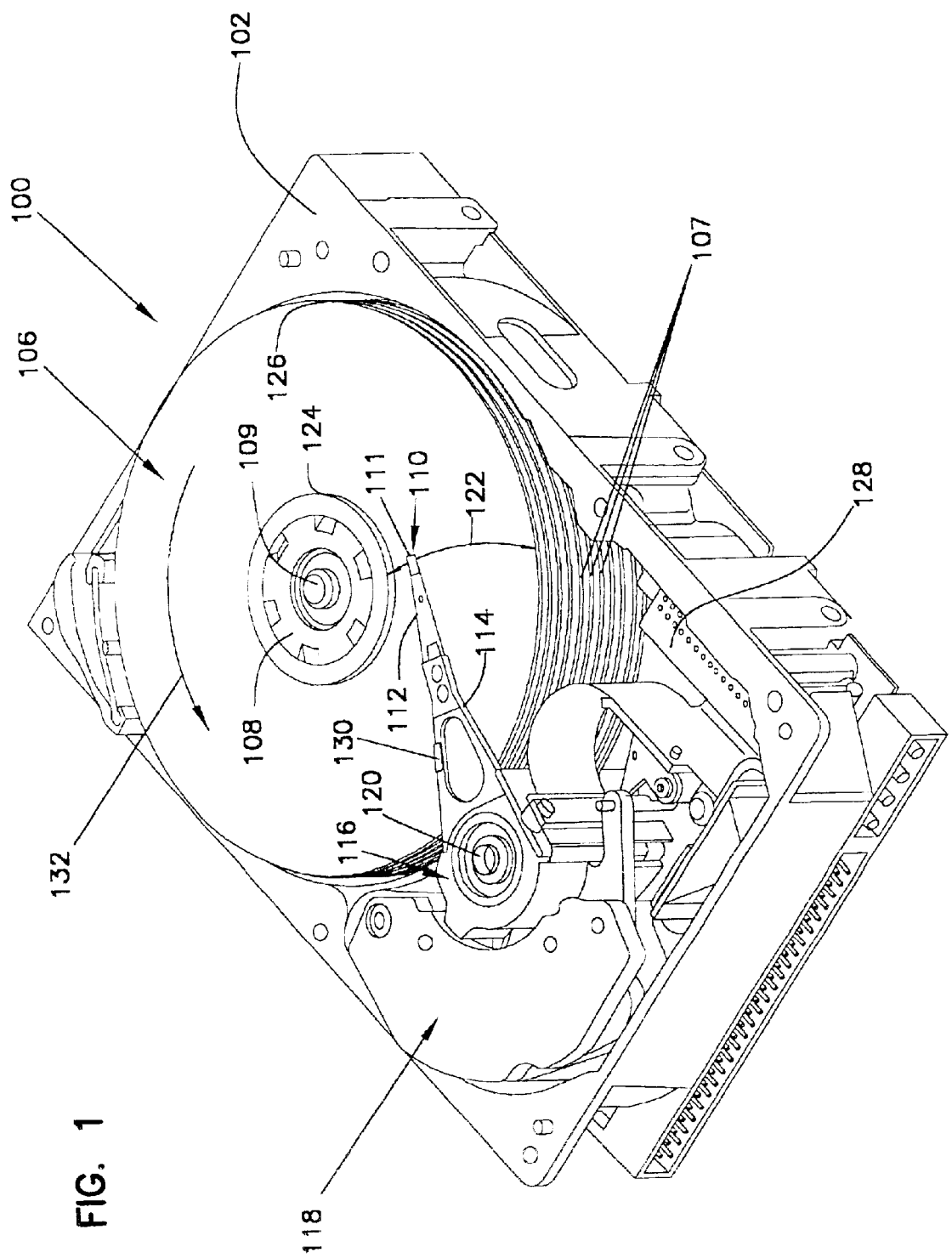
FIG. 1 is a perspective view of a disc drive in which aspects of the present invention may be practiced.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108 for rotation in the direction of arrow 132. Disc pack 106 includes a plurality of individual discs 107, which are mounted for co-rotation about central axis 109. Each disc surface has an associated slider 110 that is mounted in disc drive 100 for communication with the confronting disc surface. Slider 110 is arranged to fly above the associated disc surface of an individual disc 107 of disc pack 106, and carries a transducing head 111 arranged to write data to, and read data from, concentric tracks on the confronting disc surface. In the example shown in FIG. 1, sliders 110 are supported by suspensions 112 which are in turn attached to track accessing arms 114 of an actuator 116. Actuator 116 is driven by a voice coil motor (VCM) 118 to rotate the actuator 116, and its attached sliders 110, about a pivot shaft 120. Rotation of actuator 116 moves heads 111 along an arcuate path 122 to coarsely position the heads 111 over a desired data track between a disc inner diameter 124 and a disc outer diameter 126. Microactuator 130 is mounted on each arm 114 and is operable to finely position the head(s) 111 relative to the desired track.

Microactuator 130 may be any of several types of micromotor, such as a piezoelectric motor, designed to effectively lengthen or shorten an edge portion of arm 114, or to skew the position of a gimbal (not shown) or slider 110 with respect to arm 114, or to rotate a distal portion of the arm 114. The microactuator 130 includes an active element, such as a piezoelectric crystal, that changes a physical dimension along a given axis upon application of a drive signal. The microactuator 130 may be a linear motor, designed to provide linear movement, or a rotary motor, designed to provide rotational movement. The microactuator 130 is responsive to position signals to fine position the transducing portion of head 111 relative to a track on the confronting surface of disc 107. The active element, or crystal, of microactuator 130 also generates a signal upon physical distortion of the element, such as when subjected to vibration. The present invention takes advantage of this property.

To position a head 111, voice coil motor 118 and microactuator 130 are operated by position signals from servo electronics 200 (FIG. 2) on circuit board 128, which in turn are derived from error signals generated by heads 111 and position signals from a host computer (not shown). Read and write electronics are also included on circuit board 128 to supply signals to the host computer based on data read from disc pack 106 by the read portions of heads 111, and to supply write signals to the write portions of heads 111 to write data to the discs 107.

Each slider 110 is arranged to "land" on the surface of the respective disc 107 to park in a landing zone established for that purpose. At start-up of disc drive 100, disc pack 106 begins to rotate in the direction of arrow 132, carrying air, in the form of wind, along the surface of each disc 107. Each aerodynamic slider 110 will "take-off" from the respective disc surface when the discs 107 reach a predetermined rotational velocity, creating windage having a predetermined linear velocity at each landing zone. The sliders are arranged to "fly" a design height above the respective disc surfaces when the discs 107 rotate at a design rotational velocity. For example, for a disc drive 100 designed to rotate at a velocity of 3600 revolutions per minute (rpm), the take-off velocity may be some disc velocity below the design velocity, such as 2000 rpm. Similarly, upon shut-down of the disc drive 100, arm 114 moves the respective slider 110 to fly above the landing zone, and the spindle motor operating disc pack 106 is powered down, allowing discs 107 to slow in rotational velocity until the windage created by the rotating disc 107 no longer supports the slider 110. Sliders 110 thus "land" on the disc surface at the landing zone.

Figure 2:
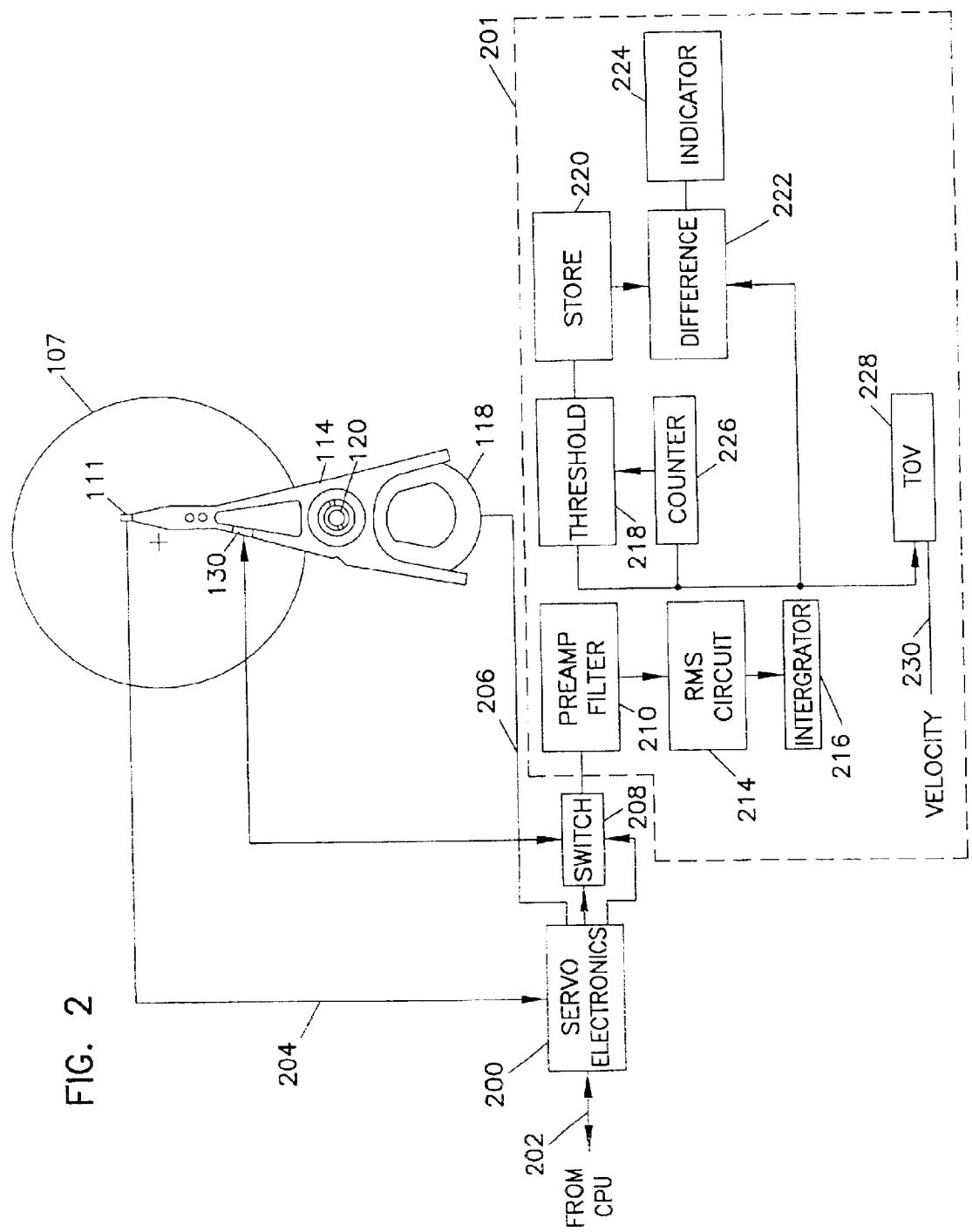
FIG. 2 is a schematic representation of a portion of the disc drive illustrated in FIG. 1 in accordance with an embodiment of the present invention.

FIG. 2 is a schematic diagram illustrating the arrangement of the actuator arm 114 illustrated in FIG. 1 with electronics that provide position control for the actuator arm 114, as well as means 201 for predicting a head crash in accordance with the presently preferred embodiment of the present invention. Servo electronics 200 receives position signals via input 202 from the central processing unit (not shown), and receives position error signals at input 204 from head 111, in a manner well known in the art. Electronics 200 provides an output at 206 to voice coil motor 118 to coarsely position head 111 relative to disc 107 by pivoting arm 114 about axis 120. In addition, servo electronics 200 provides an output to operate microactuator 130 to finely position head 111. In one embodiment, electronics 200 provides an output through switch 208 which forwards the fine position signals to microactuator 130.

During a seek operation of the disc drive 100 and when correcting a position of head 111 relative to a track, servo electronics 200 operates voice coil motor 118 and microactuator 130 to position head 111 relative to disc 107. At other times, microactuator 130 is ordinarily idle. Nevertheless, during operation of the disc drive 100, slider 110 might contact disc 107 and transmit energy, in the form of vibration, into arm 114. For example, debris on the disc 107, or on the slider 110, might affect the fly height of the slider 110 relative to the disc 107, causing the slider 110 to fly abnormally low and occasionally contact the disc 107. Additionally, the slider 110 might strike occasional perturbations on the disc 107, causing vibration. Contact also occurs during normal take-off and landing of the slider 110 during start-up and shut-down of the disc drive 100. The vibration is in the form of acoustic energy exhibiting dominant frequencies between about 200 KHz and 1 MHz. The acoustic energy distorts the active crystal element forming microactuator 130 to generate a signal representative of the acoustic energy. This signal is forwarded through switch 208 to amplifier/filter 210 that passes signals in the frequency range between about 200 KHz and 1 MHz representative of vibration. The magnitude of this signal is representative of the magnitude of the acoustic energy due to head-disc contact.

Figure 3:
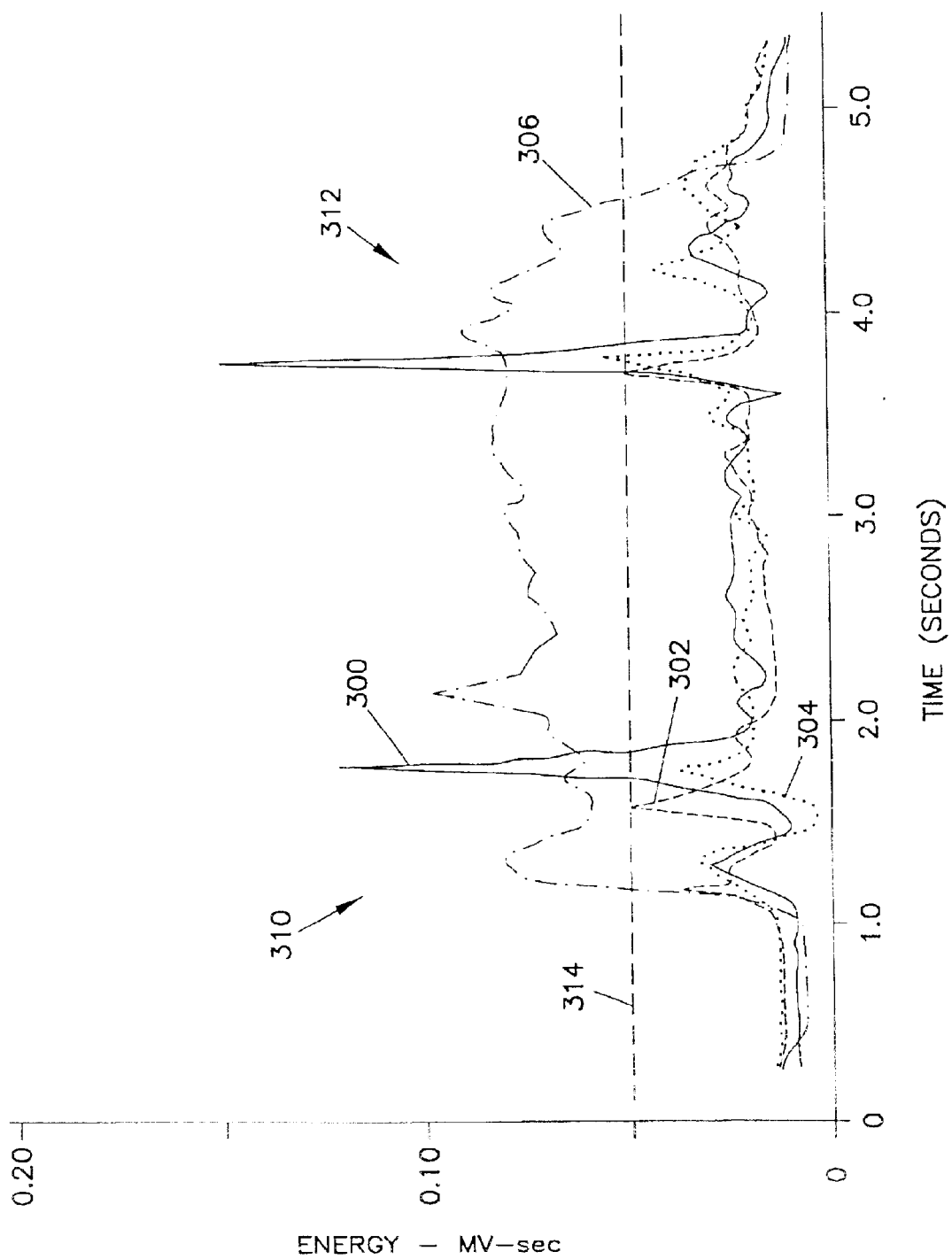
FIG. 3 is a graph useful in explaining operation of the embodiment shown in FIG. 2.

FIG. 3 is a graph illustrating the time-integrated root-mean-squared (RMS) acoustic energy relative to time for various contact start/stop (CSS) cycles of a head/disc interface, showing both take-off and landing of the slider 110 on the disc 107. The contact energy between the head 111 and disc 107 is high during periods of take-off and landing, but is low during steady state operation of the disc drive 100. Thus, curves 300, 302 and 304 illustrate the integrated acoustic energy profile over a contact start/stop cycle for the initial CSS cycle (curve 300) after 5,000 CSS cycles (curve 302) and after 10,000 CSS cycles (curve 304). The spikes in curves 300, 302 and 304 occur at the take-off and landing of the head to the disc, represented at 310 and 312, respectively.

Curve 306 in FIG. 3 illustrates the integrated RMS energy level indicated an impending crash of head 111. More particularly, we have discovered that the energy level increases dramatically over the entire contact start/stop cycle before the head 111 crashes. As shown in FIG. 3, the integrated energy level curve 306 is about three times that of the energy level of curves 300, 302 and 304.

The graphs of FIG. 3 illustrate the energy level through the take-off and landing experimentally conducted over CSS cycles having durations of about 5.5 seconds. In practice, a single CSS cycle is often measured in hours, or even days, with each CSS cycle being the duration that the host computer is powered up. Consequently, even with as many as two CSS cycles per day, 5,000 CSS cycles represents nearly seven years of the life of disc drive 100.

According to one embodiment of the present invention the energy levels are not measured during take-off or landing for purposes of predicting an impending head crash. Thus, only the steady-state flying portion of a CSS cycle (e.g., between about 2.0 and 3.5 seconds in the example of FIG. 3) is employed for head crash prediction. According to another embodiment of the present invention, energy levels are measured during take-off for other purposes, such as identifying take-off velocity of the disc drive 100.

As shown in FIG. 2, after the energy signal from microactuator 130 is amplified and filtered by circuit 210, the RMS value is detected by circuit 214 and integrated by integrator 216 to derive a curve, such as one of curves 300, 302, 304, depending on the CSS cycle. A threshold level, shown as curve 314 in FIG. 3, is established by threshold circuit 218 based on the integrated RMS value of the initial energy level and stored in storage device 220. For example, the threshold value 314 may be twice the integrated RMS value of the energy level of the initial CSS cycle taken during periods between take-off and landing. Storage device 220 may, for example, be into a location on the surface of disc 107 reserved for that purpose by the write circuits (not shown) of the disc drive 100.

Level detector 222 is responsive to the threshold value 314 stored in storage device 220 and the integrated RMS value of the energy level sensed by microactuator 130 between take-off and landing. If the integrated RMS value of the signal from microactuator 130 exceeds the threshold level 314 for a predetermined number, such as three, of CSS cycles, indicator 224 is operated to indicate an impending head crash condition. For example, indicator 224 may be a monitor associated with the computer to which disc drive 100 is attached, and arranged to display a warning to the computer user of the impending head crash. The user may take such corrective action as may be necessary, such as backing up the disc contents and replacing the disc drive.

During start-up operation of the disc drive 100, the spindle motor operates to rotate discs 107 causing sliders 110 to commence flying above the surfaces of the respective discs 107 over the landing zone. Servo electronics circuit 200 supplies position drive signals to voice coil motor 118 to move arm 114 and slider 110 so that a head 111 is adjacent a selected track on the respective disc 107. Switch 108 is operated by servo electronics circuit 200 to supply position drive signals to microactuator 130 to finely position head 111 over the center of the selected track. Once the slider fly height is established so that head 111 is centered on the track, servo circuit 200 operates switch 208 to connect micro actuator 130 to preamplifier/filter 210. Similarly, on shutdown of disc drive 100, servo circuit 200 operates voice coil motor 118 to move the arm 114 so slider 110 will land at the designated landing zone on disc 107, and operates switch 208 so that energy signals from microactuator are not processed to preamplifier/filter 210. Consequently, the energy values associated with take-off and landing are not received or processed by preamplifier/filter 210. Thus, only the regions of steady-state flying of the slider (between about 2.0 and 3.5 seconds in FIG. 3) are examined for impending head crashing.

The energy level of the initial CSS cycle establishes the threshold value. During subsequent CSS cycles, the integrated value of energy is compared to the threshold value by level detector 222. If the integrated value exceeds the threshold for a predetermined number of cycles, indicator 224 provides an output indicative of an impending crash condition. In preferred embodiments, level detector 222 must identify an integrated energy level greater than the threshold over three consecutive CSS cycles to operate indicator 224.

As shown particularly in FIG. 3, the steady-state condition (between about 2.0 and 3.5 seconds) of the initial CSS cycle, illustrated by curve 300, is greater than that of the post-5,000 and post-10,000 CSS cycles. The reason for this is that head burnishing over time reduces the head/disc interface contact and the associated acoustic energy. Consequently, it may be desirable to optionally include a counter 226 (FIG. 2) that counts the number of contact start/stop cycles and resets the threshold value stored in storage device 220 to a new baseline value after some predetermined number of CSS cycles, such as 1,000. Alternatively, counter 226 might reset the stored threshold value once after some predetermined number of CSS cycles.

Optionally, switch 208 may be operated to process signals from microactuator 130 representative of energy levels during start-up of the disc drive 100 to ascertain the take-off velocity of the respective slider 110. The integrated energy signals from integrator 216 are supplied to take-off velocity (TOV) calculator 228 which includes a second input 230 for receiving a signal representative of disc velocity. The disc velocity signal 230 may be derived from any suitable source, such as a clock synchronized to data read from disc 107 through servo electronics circuit 200, or from a tachometer attached to the spindle motor. Calculator 228 detects the energy spike associated with take-off of slider 110, and particularly to the trailing portion of that spike indicative of the moment of take-off, to determine the take-off velocity from the signal input at 130.

In summary, one embodiment of the present invention is a disc drive 100 having an actuator arm 114 supporting a transducing head 111 in confronting relation to a surface of a rotatable recording disc 107 to transfer data between the head and the surface. Predicting means 201 is attached to the actuator arm for identifying a condition of the disc drive symptomatic of an impending crash of the head to the disc surface. In preferred embodiments, the predicting means is responsive to a sensor, such as a microactuator 130 mounted to actuator arm 114 and responsive to a drive signal (from circuit 200) to selectively position head 111 relative to the surface of disc 107. Microactuator 130 is responsive to vibration of actuator arm 114 due to contact between head 111 and the surface of disc 107 to provide a signal 300–306 representative of a magnitude of contact energy between the head and the disc surface. A circuit, such as circuit 201, is coupled to microactuator 130 and periodically operable to identify a magnitude of contact energy. Circuit 201 may include an indicator 224 responsive to the representations to indicate presence of symptoms of an impending crash. The circuit 201 can include a storage device 220 for storing a representation of a threshold energy magnitude and a level detector 222 to detect a predetermined difference between a representation of contact energy magnitude from the microactuator and the stored representation of threshold energy magnitude.

In another embodiment of the invention, a head crash in a hard disc drive is predicted by periodically measuring, such as with microactuator 130, a head-disc contact energy level on an actuator arm 114 supporting the head 111, and identifying, such as with the circuit 201, a predetermined change in the energy level between at least two measured energy levels. In preferred forms of this embodiment, the head-disc contact energy is measured by measuring a vibration magnitude of actuator arm 114 during a selected contact start-stop cycle, such as an initial contact start-stop cycle 300, storing a representation 314 of the measured vibration magnitude, and periodically measuring vibration magnitudes of actuator arm 114 during subsequent contact start-stop cycles at 302, 304 and 306.

In preferred embodiments a microactuator 130 on an actuating arm 114 that supports a head 111 in a disc drive 100 is operable to fine position head 111 relative to a surface of a disc 107 to transfer data between the disc 107 and the head 111. The microactuator 130 is of a class that generates a signal based on a magnitude of vibration. Samples of the signal generated by the microactuator represent a head-disc contact energy level, and a predetermined change between at least two samples of the signal is identified.

One feature of the invention is that it employs the fine positioning microactuator already present on a disc drive to sense vibration on the actuator arm. Moreover, by measuring the vibration on each actuator arm, rather than the disc drive generally, the condition of each head/disc interface can be more accurately determined.

Although the present invention has been described with reference to a linear microactuator 130, those skilled in the art will recognize that embodiments of the present invention may be practiced with other system modifications, including but not limited to rotary microactuators and micromotors and systems employing other vibration-sensing technologies than piezoelectric crystals.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, particular elements may vary depending on the particular application for the head-disc contact energy detection while maintaining substantially the same functionality without departing from the scope and spirit of the present invention. Thus, while the invention is described in connection with piezoelectric microactuators, the process of head crash prediction might be accomplished using other types of micromotors. In addition, although the invention is described herein is directed to prediction head crashes in a magnetic disc drive, it will be appreciated by those skilled in the art that the teachings of the present invention can be applied to other devices where it is desirable to predict contact between two elements, without departing from the scope and spirit of the invention.

What is claimed is:

1. A process of predicting a crash of a transducer to a medium comprising steps of:
   a) measuring a contact energy level during at least a portion of each of a plurality of contact cycles between the transducer and the medium; and
   b) identifying a predetermined change in the energy level between at least two measured energy levels.

2. The process of claim 1, wherein step (a) comprises:
   a1) measuring a vibration magnitude of an actuator arm supporting the transducer during a selected contact start-stop cycle,
   a2) storing a representation of the measured vibration magnitude, and
   a3) measuring vibration magnitudes of the actuator arm during subsequent contact start-stop cycles.

3. The process of claim 2, wherein step (b) comprises:
   b1) calculating a difference between a representation of a most recent vibration magnitude and the representation stored in step (a2), and
   b2) identifying a difference that exceeds a predetermined threshold.

4. The process of claim 3, wherein the predetermined threshold is based on the stored representation.

5. The process of claim 4, wherein step (a) further comprises:
   a4) storing a representation of a selected vibration magnitude measured in step (a3).

6. The process of claim 3, wherein step (b2) further comprises:
   identifying when a difference exceeds the threshold a predetermined consecutive number of times.

7. The process of claim 1, further comprising:
   c) identifying a trailing end of a peak in the contact energy level during start of a contact start-stop cycle, and
   d) identifying a velocity of the medium at the trailing end of the peak.

8. The process of claim 1, wherein step (a) is performed during contact start-stop cycles and step (b) comprises:
   b1) calculating a difference between a representation of a most recent energy level and a representation of an energy level identified during a selected contact start-stop cycle in step (a),
   b2) identifying a difference that exceeds a predetermined threshold.

9. The process of claim 8, wherein step (a) comprises:
   a1) storing a representation of a selected measured energy level,
and step (b) further comprises:
   b3) basing the predetermined threshold on the stored representation.

10. The process of claim 9, wherein step (a) further comprises:
   a2) up-dating the threshold by changing the stored representation of energy level to one representing a more recent measured energy level.

11. The process of claim 8, wherein step (b2) further comprises:
   identifying the predetermined change in the energy levels when the difference exceeds the threshold a predetermined consecutive number of times.

12. The process of claim 11, wherein step (a) comprises:

a1) storing a representation of a selected measured energy level, and step (b) further comprises:

b3) basing the predetermined threshold on the stored representation.

13. The process of claim 12, wherein step (a) further comprises:

a2) up-dating the threshold by changing the stored representation of energy level to one representing a more recent measured energy level.

14. A process of predicting an impending crash condition of a device in an apparatus having a microactuator on an actuating arm that supports the device, the microactuator being of a class that generates a signal based on a magnitude of vibration, the process comprising steps of:

a) measuring samples of the signal generated by the microactuator representative of a contact energy level during at least a portion of each of a plurality of contact cycles between the transducer and the medium; and b) identifying a predetermined change between at least two samples of the signal.

15. The process of claim 14, wherein the microactuator is responsive to a drive signal to fine position the device relative to a track on the medium surface.

16. The process of claim 14, wherein a frequency of the signal samples represents device-surface contact, and a magnitude of the signal represents the energy level of the device-surface contact.

17. The process of claim 14, wherein the predetermined change is a change of magnitude of the signal.

18. The process of claim 14, wherein step (a) comprises:

a1) measuring a vibration magnitude of the actuator arm during a selected contact cycle, a2) storing a representation of the measured vibration magnitude, and a3) measuring vibration magnitudes of the actuator arm during subsequent contact cycles.

19. The process of claim 14, wherein step (b) comprises:

b1) calculating a difference between a representation of a most recent energy level and a representation of an energy level identified during a selected contact cycle in step (a), b2) identifying a difference that exceeds a predetermined threshold.

20. The process of claim 19, further comprises:

c) identifying a trailing end of a peak in the device-surface contact energy level during start of a contact cycle, and d) identifying a velocity of a medium confronting the device at the trailing end of the peak.

21. The process of claim 19, wherein step (a) comprises:

a1) storing a representation of a selected measured energy level, and step (b) further comprises:

b3) basing the predetermined threshold on the stored representation.

22. The process of claim 21, wherein step (a) further comprises:

a2) up-dating the threshold by changing the stored representation of energy level to one representing a more recent measured energy level.

23. The process of claim 19, wherein step (b2) further comprises:

identifying when the difference exceeds the threshold a predetermined consecutive number of times.

24. Apparatus comprising:

an actuator arm positioning a device in confronting relation to a medium;

a transducer supported by the actuator arm; and a circuit responsive to the transducer to indicate a condition symptomatic of an impending crash of the device to the medium, wherein the transducer comprises:

a microactuator mounted to the actuator arm and responsive to vibration of the actuator arm due to contact between the device and the medium to provide a signal representative of a magnitude of contact energy between the device and the medium, and wherein the circuit is responsive to the signal from the microactuator and operable to identify a magnitude of contact energy during at least a portion of each of a plurality of contact cycles, and the circuit further comprises:

an indicator responsive to the magnitude of at least two contact cycles to indicate presence of symptoms of an impending crash.

25. The apparatus of claim 24, wherein the circuit comprises:

a storage device for storing a representation of a threshold energy magnitude, and a level detector to detect a predetermined difference between a representation of contact energy magnitude from the microactuator and the stored representation of threshold energy magnitude.

26. The apparatus of claim 24, wherein the microactuator is further operable to selectively position the device relative to the medium.

* * * * *